(12) United States Patent
Koura et al.

(10) Patent No.: US 8,632,686 B2
(45) Date of Patent: Jan. 21, 2014

(54) APPARATUS AND METHOD FOR REMOVING WATER CONTENT FROM ORGANIC SOLVENTS

(75) Inventors: Terumasa Koura, Tsukuba (JP); Takashi Kameoka, Tsukuba (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 516 days.

(21) Appl. No.: 12/897,595

(22) Filed: Oct. 4, 2010

(65) Prior Publication Data

US 2011/0078918 A1 Apr. 7, 2011

(30) Foreign Application Priority Data

Oct. 5, 2009 (JP) ................. 2009-231804

(51) Int. Cl.
*B01D 1/14* (2006.01)
*B01D 17/02* (2006.01)
*B01D 21/00* (2006.01)
*F26B 25/06* (2006.01)

(52) U.S. Cl.
USPC ............. 210/770; 95/253; 95/254; 96/156; 96/182; 134/10; 210/86; 210/90; 210/96.1; 210/103; 210/149; 210/180; 210/182; 210/209; 210/739; 210/774

(58) Field of Classification Search
USPC ........ 210/85, 87, 90, 96.1, 134, 137, 43, 175, 210/180, 182, 209, 220, 259, 511, 634, 639, 210/739, 770, 774, 806, 143, 149, 86, 103; 96/155, 156, 182, 218; 95/8, 23, 253, 95/241, 254, 257; 34/73, 74, 77–79, 298, 34/343, 359, 376, 549, 582; 134/10
See application file for complete search history.

(56) References Cited

U.S. PATENT DOCUMENTS 3,133,018 A * 5/1964 Watanabe et al. ............. 252/364
3,714,719 A * 2/1973 Wayne ............................ 34/74
4,253,948 A * 3/1981 Hardman et al. ............. 210/634
4,596,587 A * 6/1986 Litzenburger et al. .......... 95/141

(Continued)

FOREIGN PATENT DOCUMENTS

JP 05 220303 8/1993
JP 2008 86988 4/2008

*Primary Examiner* — Joseph Drodge
(74) *Attorney, Agent, or Firm* — Patricia E. McQueeney

(57) ABSTRACT

An apparatus and method to remove water content in organic solvents characterized in that it comprises treatment tank 10 to which organic solvent is introduced, solvent inlet section 1 that introduces the organic solvent, solvent outlet section 2 from which the treated organic solvent is discharged, inert gas inlet section 3 from which inert gas is introduced, treatment gas outlet section 4 from which gas is discharged, cooling treatment tank 20 in which the treatment gas is cooled and the gas and liquid are separated, treatment gas inlet section 5 from which the treatment gas is introduced, recovered liquid outlet section 6 from which the separated liquid organic solvent is discharged, and waste gas outlet section 7 from which the separated gas is discharged, and that the water content in the organic solvent is removed by having the inert gas flow over the entire liquid surface of the organic solvent inside treatment tank 10.

12 Claims, 7 Drawing Sheets

(56) References Cited

U.S. PATENT DOCUMENTS

| | | | |
|---|---|---|---|
| 4,812,233 A * | 3/1989 | Coenen et al. | 210/177 |
| 4,877,530 A * | 10/1989 | Moses | 210/511 |
| 5,248,393 A * | 9/1993 | Schumacher et al. | 202/158 |
| 5,518,621 A * | 5/1996 | Holcombe et al. | 210/634 |
| 5,573,672 A * | 11/1996 | Rappas et al. | 210/638 |
| 6,506,259 B1 * | 1/2003 | Romack et al. | 134/10 |
| 7,537,700 B2 * | 5/2009 | Kanda et al. | 210/634 |
| 2005/0023218 A1 * | 2/2005 | Calandra, Jr. | 210/634 |
| 2006/0207934 A1 * | 9/2006 | Vernik et al. | 210/634 |
| 2008/0067124 A1 * | 3/2008 | Kaczkowski et al. | 210/634 |
| 2009/0206037 A1 * | 8/2009 | Shaimi | 210/639 |

* cited by examiner ic Solvents

APPARATUS AND METHOD FOR REMOVING WATER CONTENT FROM ORGANIC SOLVENTS

CROSS REFERENCE TO RELATED APPLICATIONS

This application claims the benefit of priority under 35 U.S.C. §119 (a) and (b) to Japanese Patent Application No. 2009-213804, filed Oct. 5, 2009, the entire contents of which are incorporated herein by reference.

BACKGROUND

The present invention relates to an apparatus and method for removing water-content from organic solvents, particularly from nonpolar organic solvents or polar aprotic organic solvents, such for example as organic solvents used as purging liquid in production devices and research facilities of semiconductors and solar cells either before or after their use, or from organic solvents that are used as materials for such purposes as organic synthesis reaction.

The term "organic solvent" used in the present invention includes solvents used broadly in industrial fields, and includes such organic solvents as octane and other fluorocarbon solvents and chlorinated solvents. The terms "nonpolar organic solvents or polar aprotic organic solvents" used in the present invention refers, for example, to such low aqueous solubility nonpolar organic solvents as n-octane, or such polar aprotic organic solvents from which the mixed-in water content is relatively easy to separate despite having polarity as tetrahydofuran (THF).

PRIOR ART

Many types of organic solvents are being used in production devices that produce such items as semiconductors and solar cells and research facilities for developing new materials, or as raw materials to produce various organic substances. These organic solvents contain water, although in small amounts, in many cases and since such water content may greatly affect such productions, research or the properties of products, they are used after specified water-content removal treatments are applied and the water content is verified. Many of the methods used to remove the water-content in organic solvents include the adsorption method using the difference in the adsorption capacities of the organic solvent and water to a specified adsorption agent, the distillation process using the difference in the boiling point of the two, and the membrane separation process using the difference in their penetration ability through a specific membrane.

More specifically, as shown in FIG. 6, a dual-tower adsorption type organic solvent treatment device (Japanese published unexamined application No. 05-220303) comprising dehydrating tower 107 and deacidification tower 108, filled with zeolite and/or aluminosilicate with micro pores of 3~80 Å in diameter as the dehydration agent and deacidification agent, has been proposed as an organic solvent treatment device to adsorb and separate water content and acidic content from recovered organic solvent discharged from such devices as a purging apparatus. Here, 101 is an inlet port for the recovered organic solvent, 102 is a solvent tank, 103 is a solvent tank float switch, 104 is a solvent tank circulation valve, 105 is a solvent pump, 106 is a flow-rate meter, 109 is a mixing tank, 110 is a mixing tank float switch, 111 is a mixing tank extraction pump, and 112 is an inlet port for such concentrated fluid as the stabilizer.

In addition, as shown in FIG. 7, as an aqueous organic compound dehydration method to extract highly concentrated organic compounds using a means of adsorbing concentrated aqueous organic compound vapor obtained from the distillation tower after the aqueous organic compound is introduced to the distillation tower, an aqueous organic compound dehydration method (Japanese published unexamined application No. 2008-86988) to extract the aqueous organic compound vapor concentrated at the top of the aforementioned distillation tower as highly concentrated aqueous organic compound vapor by supplying it sequentially to a membrane separation means and then to an adsorption means by making the reflux ratio of the aforementioned distillation tower and/or the membrane area of the aforementioned membrane separation means variable by placing the membrane separation means between the aforementioned distillation tower and the adsorption means has been proposed. It is said that high dehydration treatment capacity for aqueous organic compounds is possible by this combination of the distillation method, membrane separation means and adsorption method.

Problems to be Solved by the Invention

However, the problems described hereinafter have occurred in relation to the above-described organic solvent water-content removal treatment apparatus as it is difficult to secure a sufficient function to separate the water-content from the organic solvent.

(i) Adsorption Method

In cases of using highly lipophilic adsorption agent and separating the adsorbed concentrated organic solvent to obtain dehydration-treated organic solvent, or using highly hydrophilic adsorption agent to adsorb the water content and obtain dehydrated and concentrated organic solvent, it is necessary to replace the adsorption agent after a certain period of usage since the adsorption capacity of both said adsorption agents have limited longevity. Although there are cases in which they can be reused after a regeneration treatment using heat or a cleaning agent, a specific facility to replace or regenerate the adsorption agent becomes necessary and the corresponding cost and work hours are required.

(ii) Distillation Method

In order to use the difference in boiling points between the organic solvent and water to create a desired gas-liquid equilibrium condition, a distillation tower (rectifying tower) of a specified capacity or a device equivalent to it becomes necessary, and it is unavoidable that the water-content removal apparatus becomes a considerable size. Moreover, in order to secure a separation function inside the distillation tower, precise control of the pressure, temperature and flow-rate conditions regarding the gaseous and liquid organic solvent suited to each of the operations including heating, vaporizing, gas-liquid contact, cooling and condensation, is necessary to ensure proper performance of such operations, and thus the entire operation becomes complex and since it will involve many operational sections, it will be difficult to prevent malfunctioning.

(iii) Membrane Separation Method

The capacity to separate the organic solvent and its water content at a specific membrane is determined by the molecular sieve and the difference in pressure or concentration, but in cases the amount of water content in the organic solvent to be treated is very small (several 100 molppm (referred hereinafter simply as "ppm") or smaller), the selection of the separation membrane (permeable membrane) to make the water content further extremely small (approximately 10 ppm or smaller) is difficult. At present, there are many organic solvents for which the separation membranes with such separation function are not yet selected, and the problem regarding the limited range of use of the membrane separation method remains.

The object of the present invention is to provide a reliable and highly operable apparatus and method to remove water content in organic solvents that efficiently remove the small amounts of water content in organic solvents with a relatively simple configuration, and at the same time, without the necessity of changing component parts and preparing a large-scale apparatus.

Means for Solving the Problem

In view of the above-described problems, the present inventors conducted intensive research and discovered that the aim can be reached by means of the apparatus and method to remove water content in organic solvents described below.

The present invention is an apparatus to remove water content in organic solvents, targeting nonpolar organic solvents or polar aprotic organic solvents as treatment subject, characterized in that it comprises a treatment tank to which said organic solvent is introduced, a solvent inlet section that introduces the organic solvent to said treatment tank, a solvent outlet section from which the treated organic solvent is discharged, an inert gas inlet section from which inert gas is introduced to the aforementioned treatment tank, a treatment gas outlet section from which gas is discharged from the aforementioned treatment tank, a cooling treatment tank in which said treatment gas is cooled and the gas and liquid are separated, a treatment gas inlet section from which the treatment gas is introduced to said cooling treatment tank, a recovered liquid outlet section from which the separated liquid organic solvent is discharged, and waste gas outlet section from which the separated gas is discharged, and that the water content in the organic solvent is removed by having the aforementioned inert gas flow over the entire liquid surface of the aforementioned organic solvent inside the aforementioned treatment tank.

The present invention is also a method of removing water content in organic solvents, targeting nonpolar organic solvents or polar aprotic organic solvents as treatment subject, characterized in that it comprises a primary treatment process comprising the following processes in which:

(1) said organic solvent is introduced to a treatment tank with a specified capacity, and its rate of introduction is controlled so that a predetermined and specified liquid level is maintained;

(2) said treatment tank is heated as needed so that it is controlled to maintain a predetermined and specified temperature condition;

(3) inert gas is introduced to the aforementioned treatment tank and its introduction rate is controlled so that reduction amount of the water-content concentration in the aforementioned organic solvent is the predetermined and specified value or larger. The inert gas containing the organic solvent and water content is discharged from the aforementioned treatment tank as treatment gas.

A secondary treatment process comprising the following process in which:

(4) the organic solvent is discharged from the aforementioned treatment tank when the water-content concentration in the organic solvent inside the aforementioned treatment tank reaches a predetermined and specified value or smaller.

A third-order treatment process comprising the following processes in which:

(5) the aforementioned treatment gas is introduced to a cooling tank with a specified capacity to be cooled to a predetermined and specified temperature, and the gas and liquid is separated;

(6) the separated gas is discharged as waste gas from said cooling treatment tank.

And a fourth-order treatment process comprising the following process in which:

(7) separated liquid organic solvent accumulated at the bottom of the aforementioned cooling treatment tank is discharged from the aforementioned cooling treatment tank when its level exceeds the predetermined and specified level.

It is possible to efficiently remove small amounts of water content in organic solvents with a relatively simple configuration by this apparatus and method of removing water content equipped with a configuration having these two different stages of water content removal and separation functions. That is, with such nonpolar organic solvents as n-octane, it has been difficult to attain water-content removal using such methods as the adsorption method as efficiently as this method since its aqueous solubility is low and its water-content ratio in the organic solvent is low to begin with (the water-content ratio in n-octane, for example, is approximately 50 ppm). Moreover, with such polar aprotic organic solvents as THF, it has been difficult to separate and remove the water-content from organic solvent using such methods as the adsorption method since it mixes easily with water. The present invention, by using inert gas that does not contain water content (1 ppm or below) and having it flow over the entire liquid surface of the organic solvent, discovered that it is possible to extract the water content into the gaseous phase since (i) the gas-liquid equilibrium condition between the water content in the organic solvent and the water content in the gaseous phase is broken and the water content is extracted to the gaseous phase with nonpolar organic solvents, and (ii) separation of mixed water content is relatively easy with polar aprotic organic solvents, and moreover, discovered that it is possible to obtain the equivalent separation function as the distillation method since the water content in the organic solvent is separated and removed as the extracted treatment gas containing the organic solvent is cooled and its gas and liquid is separated. Due to this relatively simple configuration, it is possible to efficiently separate the small amounts of water content in organic solvents and provide a reliable and highly operable apparatus and method of removing water content from organic solvents without the necessity of changing the component parts and preparing a large-scale apparatus.

The present invention is the aforementioned apparatus for removing water content in organic solvents characterized in that it is equipped with multiple gas jetting ports that are able to spray gas in multiple directions at the tip of the aforementioned inert gas inlet section to distribute the aforementioned inert gas to the entire liquid surface of the aforementioned organic solvent. With the function to extract the water content in the organic solvent accumulated, which is one of the major roles of the treatment tank, the inert gas is distributed to the entire liquid surface of the organic solvent in the treatment tank to improve the removal rate of water content in the organic solvent.

The present invention is the aforementioned apparatus for removing water content in organic solvents characterized in that the organic solvent inside the aforementioned treatment tank is controlled to maintain the specified liquid surface level and specified temperature and pressure conditions, and at the same time a purge treatment with inert gas is perform while an agitation treatment is being performed to the gaseous phase section of the aforementioned treatment tank and/or said organic solvent layer. By adopting this configuration, it is possible to constantly ensure gas-liquid contact between new organic solvent liquid surface and the inert gas, and hence highly operable and extremely efficient removal of water content from organic solvent has become possible.

The present invention is the aforementioned apparatus for removing water content in organic solvents characterized in that the gas introduced from the aforementioned inert gas inlet section is a mixture of the aforementioned organic solvent in gaseous state and inert gas. By adopting this configuration, it is possible to reduce the amount of organic solvent accompanying the treatment gas and increase the yield of the organic solvent from the water-content removal treatment. Therefore, it is possible to ensure high yield throughout the entire water-content removal apparatus by decreasing the reduction amount of the organic solvent at the water-content removal treatment at the first-stage treatment tank and increasing the supply amount of the concentrated organic solvent from it. Moreover, it has become possible to reduce the energy consumption amount throughout the entire water-content removal apparatus by reducing the condensation amount at the latter stage and thus reducing the condensation calorie.

The present invention is the aforementioned apparatus for removing water content in organic solvents characterized in that a detector that detects the water-content concentration in the organic solvent inside the aforementioned treatment tank and cooling treatment tank is installed, and when the water-content concentration in the organic solvent becomes the specified level or below, it is discharged from the aforementioned solvent outlet section or the recovered liquid outlet section. As stated previously, organic solvents such as purging fluid used in such devices as semiconductors and solar cells production devices may greatly affect the characteristics of the products depending on their amount of water content. The present invention is provided to ensure supply of adequate organic solvents as the final outcome by controlling and managing the water-content concentration in the organic solvents to which the water-content removal treatment has been applied as described above.

The present invention is the aforementioned apparatus for removing water content in organic solvents characterized in that it forms a solvent circulation system that comprises a flow path that extracts part of the organic solvent diverged from the aforementioned solvent outlet section and connects to the aforementioned inert gas inlet section, a vaporizer that vaporizes said part of the organic solvent, a pump that pressure-feeds the vaporized organic solvent, and a mass-flow controller that controls the vaporized organic solvent at a specified supply flow rate, and/or a recovered liquid circulation system that comprises a flow path that extracts part of the recovered liquid diverged from the aforementioned recovered liquid outlet section and connects to the aforementioned recovered liquid outlet section, a vaporizer that vaporizes said part of the organic solvent, and a flow-rate adjustment section that adjusts the vaporized organic solvent to the specified supply flow rate. As stated above, it is possible to raise the efficiency of water-content extraction by using the purge gas that contains the organic solvent in advance. At this time, by forming a circulation system that uses the organic solvent (contained in purge gas) to which the water-content removal treatment has been applied at the treatment tank or the cooling treatment tank rather than separately preparing organic solvent, it is possible to further increase the organic solvent concentration function in addition to securing high yield throughout the entire water-content removal apparatus and reducing the energy consumption as described above, and supply the desired organic solvent from which the water content is removed from the solvent outlet section and the recovered liquid outlet section in a short period of time.

OPTIMAL CONFIGURATION FOR IMPLEMENTING THIS INVENTION

Figure 1:
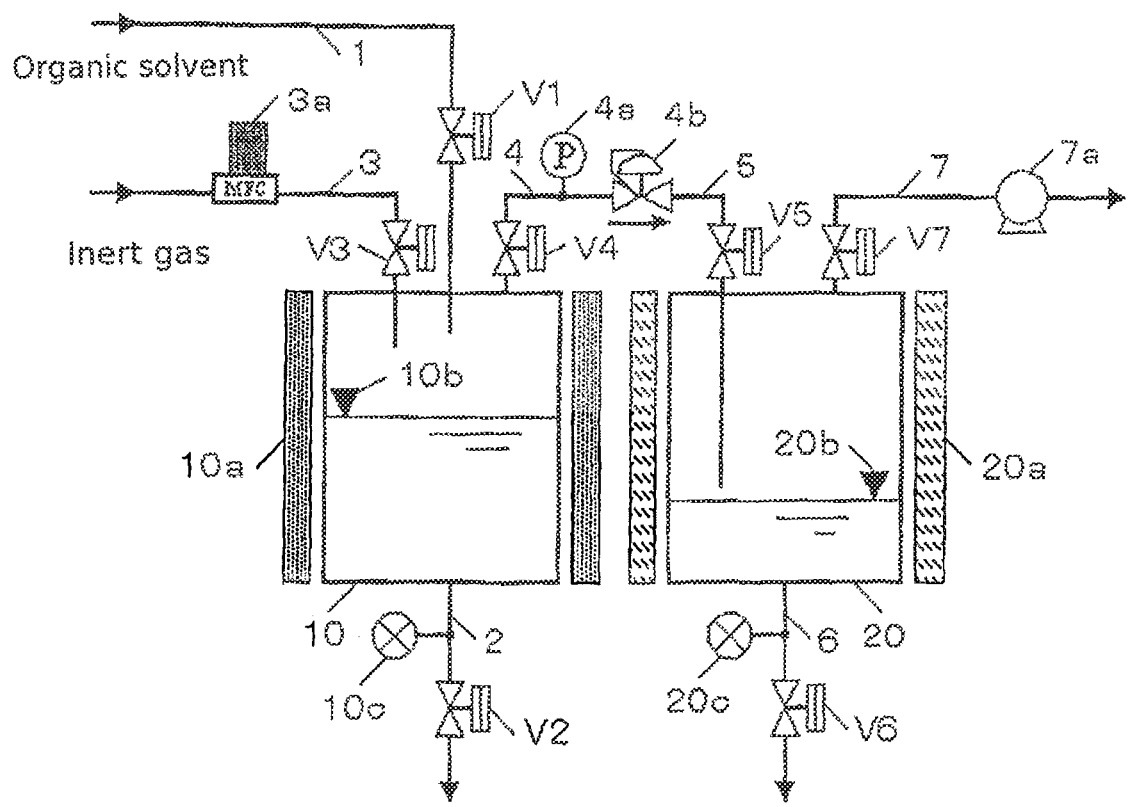
FIG. 1 is a schematic illustration of the basic configuration example of the inventive organic solvent water-content removal apparatus.

Hereafter, the embodiments of the present invention will be described on the basis of the drawings. The present invention is an apparatus to remove water content in organic solvents (referred to hereinafter as "this apparatus") characterized in that it comprises a treatment tank to which organic solvent is introduced, an inlet section that introduces the organic solvent to the treatment tank, a solvent outlet section from which the treated organic solvent is discharged, an inert gas inlet section from which inert gas is introduced to the treatment tank, a treatment gas outlet section from which gas is discharged from the treatment tank, a cooling treatment tank in which the treatment gas is cooled and the gas and liquid are separated, a treatment gas inlet section from which the treatment gas is introduced to the cooling treatment tank, a recovered liquid outlet section from which the separated liquid organic solvent is discharged, and a waste gas outlet section from which the separated gas is discharged, and that the water content in the organic solvent is removed by having the inert gas flow over the entire liquid surface of the organic solvent inside the aforementioned treatment tank.

The "organic solvents" referred to herein are not limited particularly to those including various processing gases, but include such solvents used widely industrially as, for example, organic octane solvents as well as fluorocarbon and chlorine organic solvents. Although they are generally in liquid state at ambient temperatures (20~30° C.) and normal pressures (approximately 0.1 MPa), here they also broadly include solvents that are liquefied under added pressure conditions or low temperature conditions. More specifically, such organic solvents as those after being used as purging liquid in such devices as semiconductor and solar cell production devices or those used in such research facilities for semiconductors and solar cells, and those used as materials for such processes as organic synthesis reaction can be listed. Moreover, the terms "nonpolar organic solvents or polar aprotic organic solvents" refer to nonpolar organic solvents with low aqueous solubility or aprotic organic solvents that is polarized but can be separated from its mixed-in water content relatively easily. More specifically, as examples of the former, such solvents as saturated hydrocarbon with carbon number 6 or more (such as n-hexane and n-octane) and saturated cyclic hydrocarbon (such as cyclohexane) can be listed and as examples of the latter, ketone (such as acetone), ester (such as ethyl acetate), aromatic compounds (such as benzene and toluene), cyclic ether compounds (such as THF) and heterocyclic compounds (such as pyridine) can be listed. The inventive apparatus is applicable also in cases of treating organic solvents with low water content as the latter solvents that have previously been difficult to treat, and is particularly effective in cases of treating organic solvents with water content of 300 ppm or smaller and bringing their residual water content to infinitesimal amounts (approximately 10 ppm or smaller) as verified later using THF.

Basic Configuration Example of the Inventive Apparatus

FIG. 1 is a schematic illustration of the basic configuration example (configuration example 1) of the inventive apparatus comprising treatment tank 10 to which the treated organic solvent is introduced and stored, and in which the water content is extracted by inert gas, and cooling treatment tank 20 in which the treatment gas from treatment tank 10 is cooled and gas-liquid separation is performed. To treatment tank 10, solvent inlet section 1 from which the organic solvent is introduced, solvent outlet section 2 from which the treated organic solvent is discharged, inert gas inlet section 3 from which the inert gas is introduced, and treatment gas outlet section 4 from which the treatment gas that contains water content is discharged are connected. To cooling treatment tank 20, treatment gas inlet section 5 from which the treatment gas is introduced, recovered liquid outlet section 6 from which the separated liquid is discharged, and waste gas outlet section 7 from which the separated gas is discharged are connected. The inlet sections and outlet sections 1~7 are equipped with on-off valves V1~V7 that control the gas and liquid that are introduced and discharged.

The organic solvent to be treated is introduced from solvent inlet section 1 via on-off valve V1 to treatment tank 10, and the organic solvent is newly replenished as on-off valve V1 is activated by the control section (not shown in the figure) until it reaches the specified liquid surface level. Water-content removal treatment is applied to the organic solvent stored in treatment tank 10, while its liquid surface is kept nearly at a constant level, by having the inert gas flow over its entire liquid surface, and the organic solvent whose water content reaches the specified amount or smaller is discharged via on-off valve V2 from solvent outlet section 2. The organic solvent accompanying the distributed inert gas is discharged as part of the treatment gas with the water content via on-off valve V4 and treatment gas outlet section 4 from treatment tank 10, and then introduced to cooling treatment tank 20 via on-off valve V5 and treatment gas inlet section 5. The organic solvent in the treatment gas introduced to cooling treatment tank 20 is cooled, condensed and liquefied at cooling treatment tank 20 and stored inside cooling treatment tank 20. The organic solvent reaching the specified amount is discharged via on-off valve V6 from recovered liquid outlet section 6. With this two-stage treatment using treatment tank 10 having a function of extracting the water-content using the inert gas, and cooling treatment tank 20 having a water-content separation function using gas-liquid separation after cooling by the treatment gas, it is possible to efficiently remove and separate the small amount of water content contained in organic solvents.

At this time, most of the dissolved or mixed in water content in the organic solvent stored in treatment tank 10 accompanies the inert gas introduced from inert gas inlet section 3 via on-off valve V3, is discharged from treatment tank 10 via on-off valve V4 and treatment gas outlet section 4 as part of the treatment gas, and is then introduced to cooling treatment tank 20 via on-off valve V5 and treatment gas inlet section 5. A part of it remains in a state dissolved or mixed in as ultra-low volume water content in the organic solvent store in treatment tank 10 and then discharged with the organic solvent from solvent outlet section 2 via on-off valve V2. Most of the water content in the treatment gas introduced to and cooled at cooling treatment tank 20 is discharged as part of the waste gas from waste gas outlet section 7 via on-off valve V7, and a part of it is dissolved or mixed in the condensed and liquefied organic solvent as ultra-low volume water content and separated, and then discharged with the organic solvent from recovered liquid outlet section 6 via on-off valve V6.

As the inert gas to extract the water content from the organic solvent, such for example as nitrogen and argon that have little impurities as water content and easy to obtain are desirable. The inert gas is controlled by mass-flow controller 3a so that its flow rate is maintained at a prescribed volume, and introduced to treatment tank 10 via on-off valve V3 from inert gas inlet section 3. The inert gas introduced accompanies the organic solvent at the gaseous phase section and the extracted water content, discharged as treatment gas from treatment tank 10 via on-off valve V4 and treatment gas outlet section 4, and then introduced to cooling treatment tank 20 via on-off valve V5 and treatment gas inlet section 5. At this time, manometer 4a and pressure regulator 4b are installed so that the pressure inside treatment tank 10 is controlled to be at a predetermined specified value. In FIG. 1, a back-pressure control means is used as pressure regulator 4b and installed with manometer 4a between treatment gas outlet section 4 and treatment inlet section 5, but this invention is not limited to this configuration and it is also possible to adopt various configurations such as controlling the pressure by installing a secondary pressure control means at the inert gas inlet section side and a throttle valve (not shown in the figure) at the treatment gas outlet section 4. The treatment gas cooled at cooling treatment tank 20, from which much of the organic solvent condensed and liquefied is separated, is discharged as waste gas containing water content and part of the organic solvent via on-off valve V7 from waste gas outlet section 7. At this time, in FIG. 1, suction pump 7a is installed at waste gas outlet section 7 so that the pressure inside treatment tank 20 is decreased to reduce the water-content amount that is dissolved or mixed in the organic solvent, but this invention is not limited to this configuration and it is also possible to adopt a configuration in which added pressure inside treatment tank 10 is used or a pressure-feed pump is installed at treatment gas inlet section 5.

Configuration of Treatment Tank

Treatment tank 10 is equipped with heating means 10a to control the organic solvent at a specified temperature condition, liquid surface level meter 10b that detects the liquid level so that it is nearly constant at a predetermined level, and water-content detector 10c for managing the water content concentration in the organic solvent. As heating means 10a, such heaters as a jacket heater or sheathed heater is installed inside or at the outer circumference of treatment tank 10 along with a temperature sensor or control section (not shown in the figure). As liquid surface level meter 10b, such sensors, for example, as the ultrasonic sensor or float-type sensor is used and installed inside or at the outer circumference of treatment tank 10. Water-content detector 10c controls and manages water-content concentration in the organic solvent supplied to ensure adequate product quality of the final product, and more specifically, such detector as the Karl Fischer's type or absorptiometric type detector is installed along with a control section (not shown in the figure). FIG. 1 shows a configuration in which water-content detector 10c is installed in solvent outlet section 2 as an example, but in cases of using a light transmission type detector as the absorptiometric type, it may be installed in the outer circumference of treatment tank 10.

As the control temperature of treatment tank 10, a temperature that assures evaporation of water content and suppresses evaporation of organic solvent is desirable. More specifically, using organic solvent with low concentration (1% or lower) water content (for example 0.6% that corresponds to vapor pressure at 0° C. at 0.1 MPa pressure) as the solvent to be treated in the inventive apparatus so that it will contain an extremely small amount of water (several 100 ppm or smaller), or using organic solvent that contains an extremely small amount of water as the solvent to be treated in the inventive apparatus so that it will contain an infinitesimal amount of water (several 10 ppm or smaller), it is desirable to set the temperature at a temperature that establishes static gas-liquid equilibrium of the water content concentration in the organic solvent or higher and, at the same time, the boiling temperature of the organic solvent or lower. The following temperature settings are shown in Table 1 below as examples for some organic solvents.

TABLE 1

| Organic solvent | Boiling point (° C.) | Control temperature in case of containing extremely small amount of water (° C.) |
|---|---|---|
| n-hexane | 69 | Room temp. (ambient temp.) ~30 |
| n-octane | 125 | Room temp. (ambient temp.) ~50 |
| THF | 66 | Room temp. (ambient temp.) ~30 |
| Pyridine | 115 | Room temp. (ambient temp.) ~50 |

Figure 2:
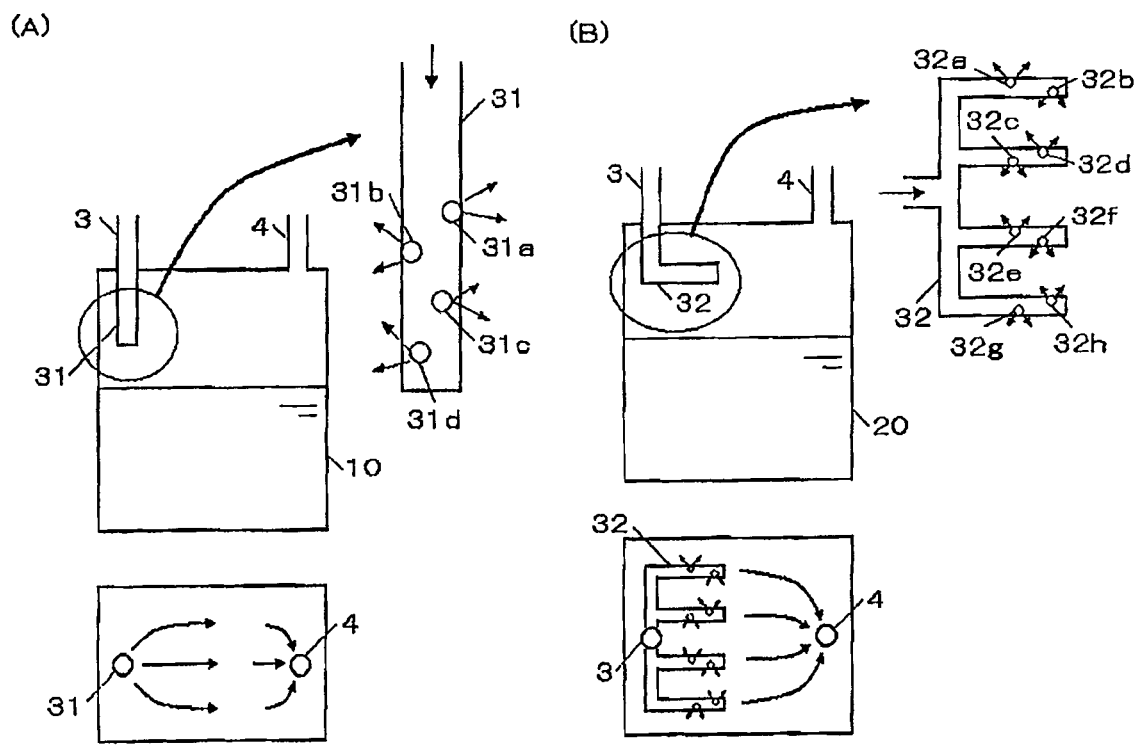
FIG. 2 is a schematic illustration of the configuration example of the inert gas inlet section of the inventive organic solvent water-content removal apparatus.

Here it is desirable to install a multiple number of gas injection ports that are capable of spraying in multiple directions at the tip of inert gas inlet section 3 so that the inert gas is distributed over the entire liquid surface of the organic solvent. That is, in order to efficiently extract water content from the organic solvent, it is desirable to constantly assure gas-liquid contact between the new organic solvent liquid surface and the inert gas, and it is also desirable that treatment tank 10 in which the organic solvent is stored provide as large a liquid surface area as possible and, at the same time, to distribute the inert gas so that the water content is accompanied evenly from the entire liquid surface. As shown in FIG. 2 (A) or (B), the inventive apparatus is equipped with a multiple number of gas injection ports 31a~31d, and 32a~32h, that are capable of spraying in multiple directions at the tip of inert gas inlet section 3, and is capable of efficiently promoting water content to accompany from the liquid surface of the organic solvent and at the same time promote mass transfer of water content in the liquid phase section to the liquid surface, and extracting water content from the organic solvent by spraying the inert gas evenly to the entire gaseous phase section in the treatment tank from them.

More specifically, in FIG. 2 (A), by this configuration with a multiple number of gas injection ports 31a~31d, it is possible to distribute the inert gas over the entire liquid surface of the organic solvent. As a result of promoting transfer and dispersion of water content due to the difference in water-content concentration between the liquid surface section and liquid phase section (together, they are termed "organic solvent layer" and may be referred hereinafter as "liquid phase section) caused by water content accompanying from the liquid surface, by the new inert gas flow that forms a state in which the gaseous phase section of the organic solvent is not stagnant but constantly agitated, it is possible to increase the water-content removal efficiency from the organic solvent. After verification, the present inventors obtained a result that it is suitable in cases where the volume of the gaseous phase section is smaller than 3 L.

Moreover, as shown in FIG. 2 (B), it is possible to distribute the inert gas over the entire liquid surface of the organic solvent by installing a multiple number of branch pipes arranged in parallel to the liquid surface at the tip 32 of inert gas inlet section 3, and adopting a configuration in which a multiple number of gas injection ports 32a~32h, that are capable of spraying in multiple directions, is installed at each branch pipe. As a result of promoting transfer and dispersion of water content due to the difference in water-content concentration between the liquid surface section and liquid phase section caused by water content accompanying from the liquid surface, by the new inert gas flow that forms a state in which the gaseous phase section of the organic solvent is not stagnant but constantly agitated, it is possible to increase the water-content removal efficiency from the organic solvent. After verification, the present inventors obtained a result that it is suitable in cases where the volume of the gaseous phase section is 3 L or larger.

It is further possible to install nozzles (not shown in the figure) that spray inert gas in specific directions at aforementioned gas injection ports 31a~31d, and 32a~32h. For example, in FIG. 2 (A), the inert gas sprayed from injection ports 31a~31d located at differing heights from the liquid surface, can form gas flows with varying angles and impact speed to the liquid surface, and can form agitation flows evenly over the entire liquid surface. Moreover, as shown in FIG. 2 (B), the inert gas sprayed from gas injection ports 32a~32h installed at the branch pipes arranged in parallel to the liquid surface can form gas flows that run along the liquid surface, the water content can be accompanied evenly from the entire liquid surface and, at the same time, form gas flows that quickly replaces gas over the liquid surface.

Another Configuration Example of the Treatment Tank

Figure 3:
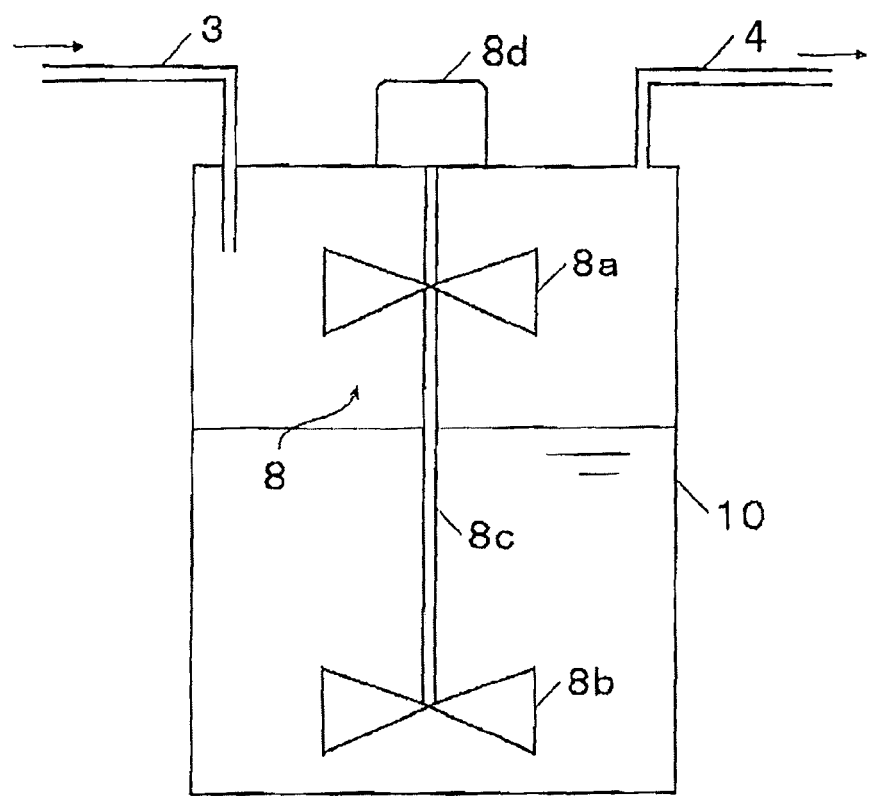
FIG. 3 is an explanatory drawing showing an example of the agitation means inside the treatment tank of the inventive organic solvent water-content removal apparatus.

In treatment tank 10, it is desirable to perform a purge treatment using inert gas while applying an agitation treatment to the gaseous phase section and/or the liquid phase section in the treatment tank. That is, in cases of physically separating the organic solvent and its water content, the gas-liquid contact condition between the inert gas and the liquid surface, along with the gas and liquid temperature and pressure conditions, may affect the outcome. In the inventive apparatus, as shown in FIG. 3, by installing agitator 8 (corresponds to "agitation means") in which shaft 8c connected to agitation blades 8a and 8b is rotated by driving section 8d, at the gaseous phase section and liquid phase section, both the gaseous phase section and liquid phase section can be simultaneously agitated by rotating agitation blades 8a and 8b simultaneously to promote water content to accompany as the uniformity of the distribution of water content in the gaseous phase is raised, promote uniformity of water content in the organic solvent in the liquid phase section, and thus promote mass transfer and dispersion of water content due to the difference in water-content concentration between the liquid surface layer where the water-content concentration has decreased and deeper liquid layers. However, such agitation function does not necessarily have to be installed in both the gaseous phase and liquid phase sections, and in cases the liquid surface area is large or the gaseous phase section is large in treatment tank 10, installing agitation blade 8a only in the gaseous phase section where the agitation effect is large will function sufficiently. By applying a purge treatment while agitating the gaseous phase section and/or the liquid phase section in treatment tank 10 in this manner, it is possible to ensure constant gas-liquid contact between new liquid surface of the organic solvent and the inert gas, and, hence, realize extremely efficient removal of water content from the organic solvent.

Moreover, as the gas introduced from inert gas inlet section 3, it is desirable to use mixed gas in which the organic solvent to be treated in gaseous state is mixed with inert gas. That is, in cases of extracting water content from organic solvent, the amount of water content accompanying the gas is generally greater if the water-content concentration in the gas that contacts the organic solvent is low, and at the same time, the amount of liquid-phase organic solvent accompanying the gas is smaller if the concentration of the organic solvent is high. As a result of verifying these concepts, by adding the organic solvent in gaseous state to the inert gas used for extraction in the inventive apparatus, it was found that the amount of organic solvent accompanying the inert gas can be reduced and the yield of organic solvent after the water-content removal treatment can be raised. That is, it is possible to ensure high yield throughout the entire water-content removal apparatus by decreasing the reduction amount of the organic solvent at the water-content removal treatment in the first stage treatment tank, and increasing the amount of concentrated organic solvent discharged from it, high yield can be ensured throughout the entire water-content removal apparatus, and at the same time, it is possible to reduce energy consumption throughout the entire water-content removal apparatus by reducing the condensation calorie by reducing the amount of condensation at the latter stage. Moreover, by adopting this configuration, since it is possible to suppress organic solvent layer from the liquid phase section from accompanying the inert gas while ensuring evaporation of the water content, it is possible to further improve the yield of the organic solvent particularly in cases the boiling point of the organic solvent is lower than the boiling point of the water content, by setting the control temperature of treatment tank 10 above the boiling point of the organic solvent and near the boiling point of the water content or above. At this time, it is possible to further improve the yield of the organic solvent by reducing the flow rate of the inert gas introduced from inert gas inlet section 3 and increasing the flow rate of the gaseous state body of the organic solvent. In cases it is easy to obtain organic solvent containing an extremely small amount of water content, it is also possible to use the gaseous state body of the organic solvent in place of inert gas.

Configuration of Cooling Treatment Tank

Cooling treatment tank 20 is equipped with cooling means 20a to control the treatment gas at a specified cooling temperature, liquid surface level meter 20b that detects the liquid surface level to ensure the condensed organic solvent is filled to the predetermined specified level, and water-content detector 20c to manage the water-content concentration in the organic solvent. Cooling means 20a comprising such elements as cooling elements and refrigerant tank (includes refrigerant cooling section and refrigerant circulation system) is installed with a temperature sensor or controller inside or at the outer circumference of cooling treatment tank 20. Liquid surface meter 20b and water-content detector 20c are installed in the same manner as liquid surface meter 10b and water-content detector 10c in aforementioned treatment tank 10.

It is desirable that the cooling temperature is a temperature that ensures condensation of the organic solvent and suppresses condensation of water content. More specifically, a temperature which is equal or inferior to the desired water concentration in the organic solvent, that is, a temperature that establishes static gas-liquid equilibrium of said water-content concentration or below, and the boiling point of the organic solvent or above. In cases of treating so that the water-content concentration in the organic solvent becomes an extremely small amount (several 100 ppm or below) of water content, the temperature corresponding to vapor pressure at 0.1 MPa is approximately −25° C., and in cases of treating so that the water-content amount becomes infinitesimal amount (several 10 ppm or below), the temperature is −45° C.

Another Configuration Example of the Inventive Apparatus

In the inventive apparatus, it is also desirable to form a solvent circulation system that vaporizes the organic solvent supplied from solvent outlet section 2 at treatment tank 10 and mixes it with inert gas, and/or a recovered liquid circulation system vaporizes the organic solvent supplied from recovered liquid outlet section 6 at cooling treatment tank 20 and mixes it with inert gas. As stated above, it is possible to ensure high yield and reduce energy consumption throughout the entire water-content removal apparatus by using purge gas in which the organic solvent is mixed in the gas introduced to treatment tank 10 from inert gas inlet section 3 in advance. Moreover, the higher the concentration of the organic solvent in the treatment gas introduced to cooling treatment tank 20 from treatment gas inlet section 5 is, the lower the water-content concentration in the liquid-state organic solvent that condenses becomes. At this time, by forming a circulation system using the organic solvent that has gone through the water-content removal treatment in treatment tank 10 or cooling treatment tank 20 rather than separately preparing organic solvent, it is possible to increase the organic solvent concentration function formed in treatment tank 10 or cooling treatment tank 20. This considerably improves the water-content removal efficiency, and enables to provide organic solvent with a desired amount of water content removed in a short period of time from the solvent outlet section and the recovered liquid outlet section.

Figure 4:
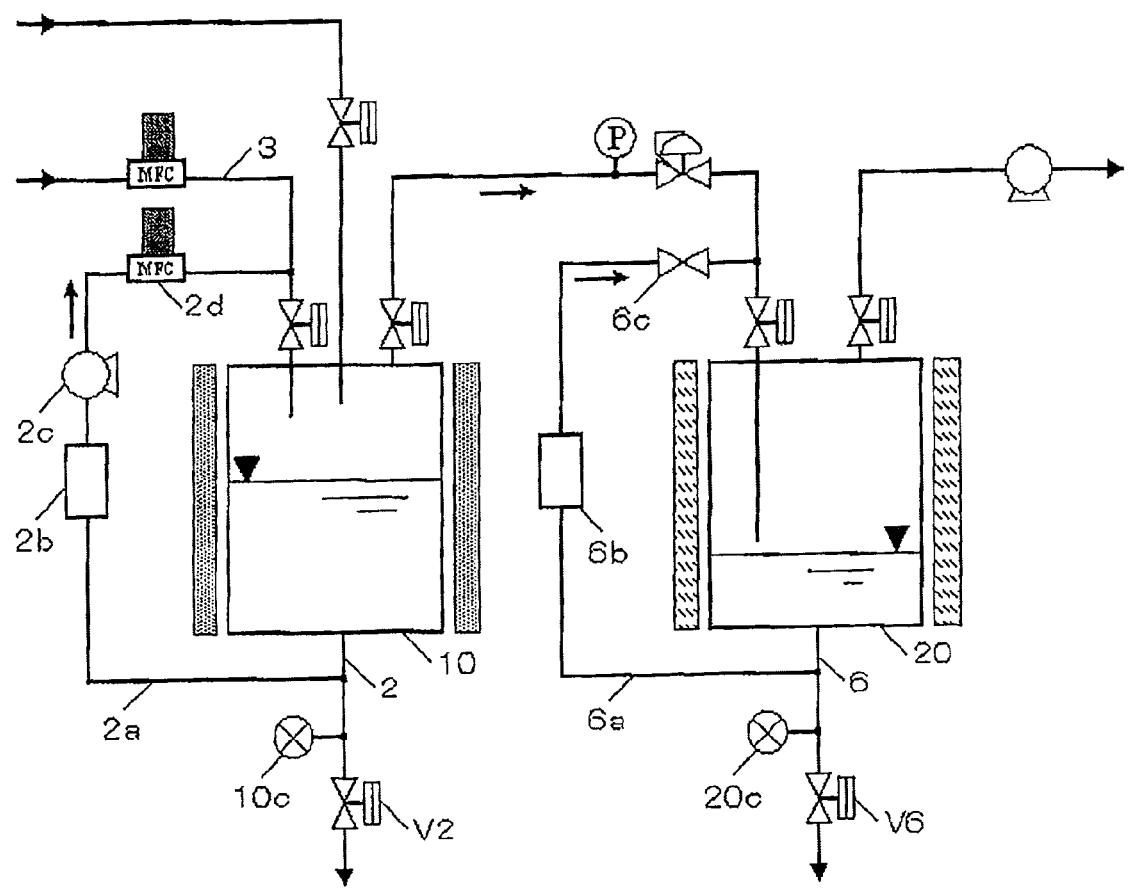
FIG. 4 is an explanatory drawing of another configuration example 1 of the inventive organic solvent water-content removal apparatus.

More specifically, as shown in FIG. 4, flow path 2a that forms a solvent circulation system that connects the branching flow path from solvent outlet section 2 to inert gas inlet section 3 is installed. Flow path 2a is equipped with vaporizer 2b that vaporizes organic solvent branched from solvent outlet section 2, pump 2c that pressure feeds the vaporized organic solvent, and mass-flow controller 2d that controls the vaporized organic solvent to a specified supply flow rate. This configuration allows introduction of purge gas containing the organic solvent from inert gas inlet section 3, and enables production of organic solvent from which the water content is removed with further improved efficiency inside treatment tank 10. Furthermore, flow path 6a that forms a recovered liquid circulation system that connects the branching flow path from recovered liquid outlet section 6 to treatment gas inlet section 5 is installed. Flow path 6a is equipped with vaporizer 6b that vaporizes organic solvent branched from recovered liquid outlet section 6, and flow-rate control section 6c that controls the vaporized organic solvent to a specified supply flow rate. This configuration allows introduction of treatment gas containing high-concentration organic solvent from treatment gas inlet section 5 to further improve the gas-liquid separation treatment efficiency and produce highly concentrated organic solvent inside cooling treatment tank 20.

However, forming both the solvent circulation system and recovered liquid circulation system as shown in FIG. 4 is not always necessary, and for products in which relatively high concentration of water content is tolerated, only the recovered liquid circulation system at the latter stage may be adopted. In cases the amount of water content tolerated varies depending on such factors as the use of the organic solvent supplied from solvent outlet section 2 and that supplied from recovered liquid outlet section 6, only either one of the circulation systems may be formed. Moreover, a case in which the solvent circulation system in which the organic solvent is used in a gaseous state is shown above, but it is also possible to form a circulation system in which part of the organic solvent in liquid state stored at the bottom of treatment tank 10 is reintroduced to treatment tank 10 from solvent inlet section 1. Since the organic solvent stored at the bottom of treatment tank 10 does not have direct contact with the inert gas and its water-content concentration is higher than that at the liquid surface layer, it is possible to further promote accompaniment of water content and, at the same time, obtain an agitation effect by transferring it to the liquid phase upper layers to have it contact the inert gas.

Moreover, with the inventive apparatus, it is possible to form a circulation system in which part of the treatment gas is mixed with the inert gas in inert gas inlet section 3 and introduced to treatment tank 10. To promote water accompaniment in the organic solvent, inert gas is introduced to treatment tank 10 under a heated condition so that the treatment gas contains a large amount of organic solvent. By mixing part of this gas with inert gas and reintroducing it treatment tank 10, it is possible to ensure high yield and reduce energy consumption throughout the entire water-content removal apparatus as described above. It is also efficient in that the amount of inert gas used as purge gas can be reduced.

Figure 5:
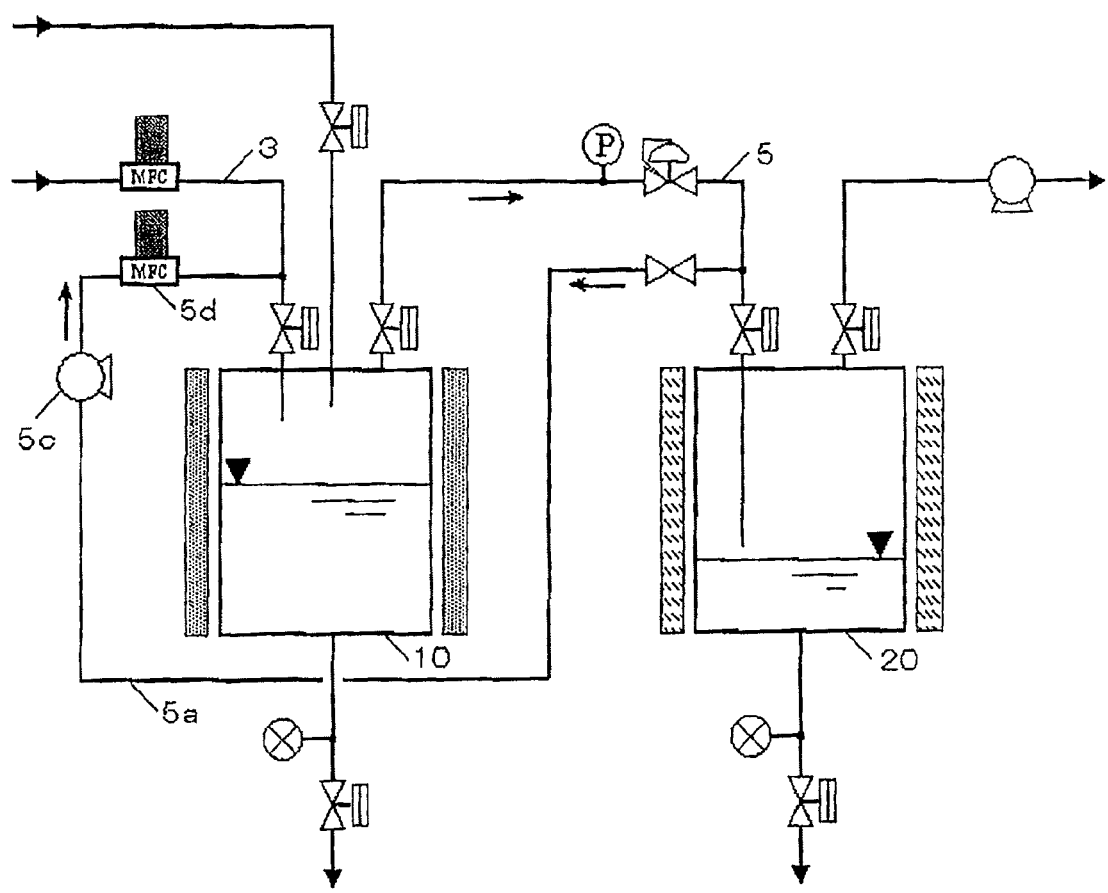
FIG. 5 is an explanatory drawing of another configuration example 2 of the inventive organic solvent water-content removal apparatus.
Figure 6:
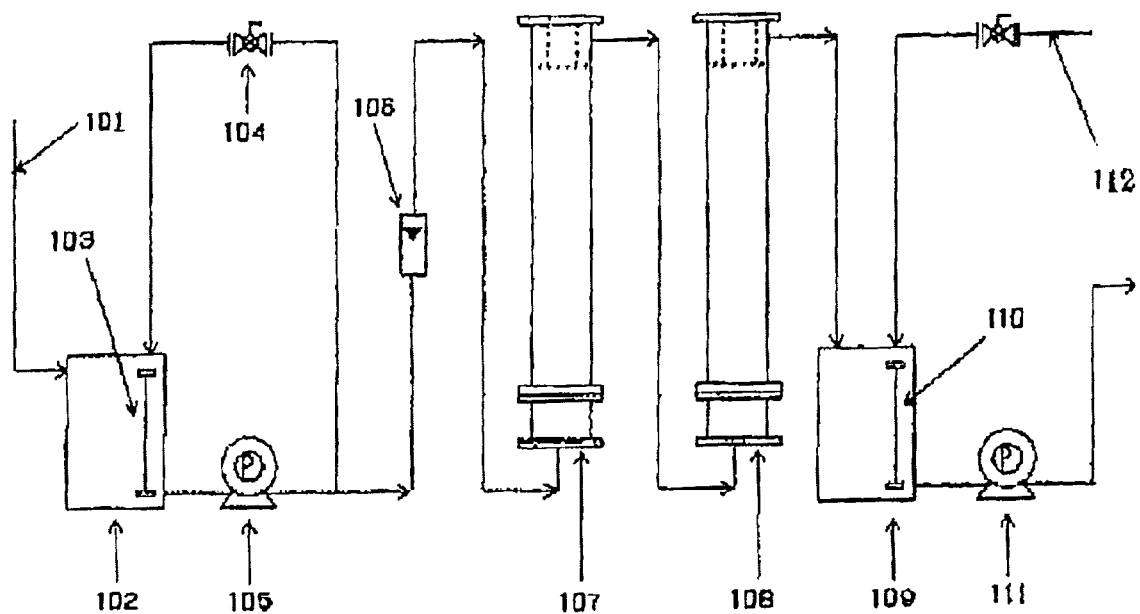
FIG. 6 is a schematic illustration showing an example of conventional organic solvent treatment apparatus.
Figure 7:
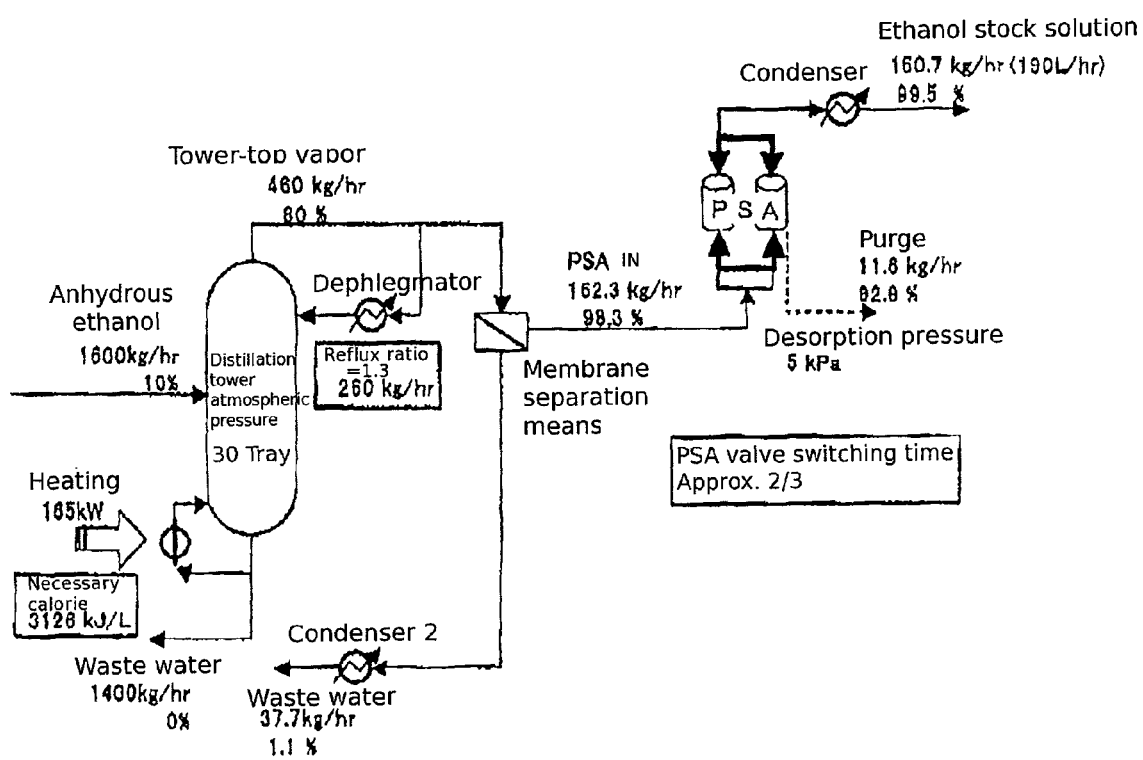
FIG. 7 is a schematic illustration showing an example of conventional aqueous organic compound dehydration method.

More specifically, as shown in FIG. 5, flow path 5a that forms a purge gas circulation system that connects the branching flow path from treatment gas inlet section 5 to inert gas inlet section 3 is installed. Flow path 5a is equipped with pump 5c that pressure feeds the branched treatment gas, and mass-flow controller 5d that controls the treatment gas to a specified supply flow rate. This configuration allows introduction of purge gas containing the organic solvent from inert gas inlet section 3, and enables production of organic solvent from which the water content is removed with further improved efficiency inside treatment tank 10. At this time, it is also possible to form a solvent circulation system along with the purge gas circulation system by connecting flow path 2a branched from solvent outlet section 2, as shown in FIG. 4 above, to flow path 5a. This allows supply of low water-content concentration purge gas that contains even more organic solvent to treatment tank 10, and enables production of organic solvent from which the water content is removed efficiently. It is also possible to combine any of the circulation systems described above with the recovered liquid circulation system shown in FIG. 4 above. This allows further efficient gas-liquid separation treatment inside cooling treatment tank 20 and production of concentrated organic solvent.

Organic Solvent Treatment Method of the Inventive Apparatus

In the inventive apparatus having the configuration described above, the water-content removal treatment in the organic solvent is performed following the treatment processes from the primary process to the fourth-order process listed below. Each process is explained based on the configuration shown in FIG. 1 in the case of controlling using a control section as an example. Here, [1] primary treatment process and [2] secondary treatment process are performed in treatment tank 10, and [3] third-order treatment process and [4] fourth-order treatment process are performed in cooling treatment tank 20.

[1] Primary Treatment Process

The primary treatment process comprises the following processes:

(1) Organic solvent is introduced to treatment tank 10 with a specified capacity and its rate of introduction is controlled so that the liquid surface level is maintained at a specified level set in advance. The organic solvent is introduced to solvent inlet section 1 by opening on-off valve V1. When the liquid surface level reaches the specified level detected by liquid surface level meter 10b, on-off valve V1 is closed and a liquid phase section and a gaseous phase section are formed.

(2) Treatment tank 10 is heated as needed, and controlled at a specified temperature condition set in advance. More specifically, it is controlled at a temperature as shown in Table 1 above corresponding to the type of organic solvent introduced and its water-content concentration by heating means 10a.

(3) Inert gas is introduced to treatment tank 10, and its rate of introduction is controlled so that the reduced amount of water-content concentration in the organic solvent is the specified value set in advance or larger. The inert gas containing the organic solvent and water content is discharged from the treatment tank as the treatment gas. The reduced amount of organic solvent that accompanies the inert gas introduced is replenished. At this time, in cases the water-content concentration in the organic solvent introduced at (1) described above detected by water-content meter 10c installed in solvent outlet section 2 is different from the specified value set in advance, it is desirable to adjust the heating temperature, inert gas introduction rate and pressure condition inside treatment tank 10 using the control section.

[2] Secondary Treatment Process

The secondary treatment process comprises the following process:

(4) The organic solvent is discharged from treatment tank 10 when the water-content concentration of the organic solvent in treatment tank 10 reaches the specified value set in advance. As to the organic solvent from which the water content is removed through the primary treatment process described above, the inventive apparatus is capable of providing organic solvent with the desired water-content concentration by water content meter 10c.

[3] Third-Order Process

The third-order treatment process comprises the following processes:

(5) The aforementioned treatment gas is introduced to the cooling treatment tank with a specified capacity and cooled to a specified temperature set in advance so that gas-liquid separation is performed. More specifically, by cooling means 20a, it is controlled at a temperature corresponding to the type of organic solvent introduced, its water-content concentration and the water-content concentration in the organic solvent to be the product.

(6) The separated gas is discharged from said cooling treatment tank as waste gas. Since the waste gas contains part of the organic solvent along with a large amount of water content, it is desirable that the waste gas is treated through a specified detoxification treatment.

[4] Fourth-Order Process

The fourth-order treatment process comprises the following process:

(7) When the level of separated liquid organic solvent stored at the bottom of aforementioned cooling treatment tank exceeds a specified liquid surface level set in advance, it is discharged from the aforementioned cooling treatment tank. As to the organic solvent from which the water content is removed through the third-order treatment process described above, the inventive apparatus is capable of providing organic solvent with the desired water-content concentration that is further managed by water content meter 10c.

Verification of Treatment Efficiency of the Inventive Apparatus

As verification of the treatment efficiency of the inventive apparatus, the water content removal treatment function in treatment tank 10 and water-content separation treatment function in cooling treatment tank 20 were verified as follows.

(a) Verification of water content removal treatment function in the treatment tank (a-1) Treatment Condition Using the inventive apparatus shown in FIG. 1, under the condition of 20° C. ambient temperature, organic solvent (n-octane containing approximately 50 ppm water content, and THF containing approximately 300 ppm of water content) was introduced to treatment tank 10 with approximately 0.5 L capacity and temperature controlled at approximately 25° C., and nitrogen gas was supplied as inert gas at flow rate of approximately 1 SLM and pressure of approximately 0.2 MPa to treatment tank 10.

(a-2) Experiment Results

The results of detecting the water-content concentration in the organic solvent stored in treatment tank 10 before and 3 hours after the removal treatment using water content meter 10c are shown in Table 2 below. The effect of water content removal using the inert gas is apparent in every case and the treatment function with high purging treatment was demonstrated.

TABLE 2

| Organic solvent | Water-content concentration before removal treatment (ppm) | Water-content concentration 3 hours after removal treatment (ppm) |
|---|---|---|
| n-octane | Approximately 50 | <2 |
| THF | Approximately 300 | <10 |

(b) Verification of Water Separation Efficiency in the Cooling Treatment Tank (b-1) Treatment Condition Using the inventive apparatus shown in FIG. 1, treatment gas containing n-octane as the organic solvent discharged from treatment tank 10 in (a) above was introduced to cooling treatment tank 20 with approximately 0.5 L capacity and cooled to approximately 0° C. or below, under negative pressure condition.

(b-2) Experiment Results

The results of detecting the water-content concentration in the organic solvent stored in cooling treatment tank 20 before and 3 hours after the removal treatment using water content meter 20c are shown in Table 3 below. The effect of water content separation using the treatment gas is apparent in every case and the gas-liquid separation function with high after-treatment effect was demonstrated.

TABLE 3

| Organic solvent | Water-content concentration 3 hours after removal treatment (ppm) |
|---|---|
| n-octane | <2 |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

EXPLANATION OF CODES

1 Solvent inlet section
2 Solvent outlet section
3 Inert gas inlet section
3a Mass-flow controller
4 Treatment gas outlet section
4a Manometer
4b Pressure regulator
5 Treatment gas inlet section
6 Recovered liquid outlet section
7 Waste gas outlet section
7a Suction pump
10 Treatment tank
10a Heating means
10b, 20b Liquid surface level meter
10c, 20c Water content detector
20 Cooling treatment tank
20a Cooling means
V1~V7 On-off valve

We claim:

1. An apparatus to remove water content in an organic solvent, the apparatus comprising:
a treatment tank to which the organic solvent is introduced,
a solvent inlet section of the treatment tank that introduces the organic solvent to the treatment tank,
a solvent outlet section of the treatment tank through which a treated organic solvent is discharged from the treatment tank,
an inert gas inlet section of the treatment tank from which inert gas is introduced to the treatment tank,
a treatment gas outlet section of the treatment tank from which treatment gas is discharged from the treatment tank,
a cooling treatment tank in which the treatment gas is cooled and gas and liquid are separated,
a treatment gas inlet section of the cooling treatment tank connected to the treatment gas outlet section through which the treatment gas is introduced to said cooling treatment tank,
a recovered liquid outlet section of the cooling treatment tank from which a separated liquid organic solvent is discharged from the cooling treatment tank,
a waste gas outlet section of the cooling treatment tank from which a separated gas is discharged from the cooling treatment tank, and
multiple gas jetting ports at the tip of the inert gas inlet section, the multiple gas jetting ports capable of spraying gas in multiple directions and distributing the inert gas to an entire liquid surface of the organic solvent,
wherein the water content in the organic solvent is removed by having the inert gas flow over an entire liquid surface of the organic solvent inside the treatment tank.

2. The apparatus of claim 1, wherein the organic solvents are nonpolar organic solvents or polar aprotic organic solvents.

3. The apparatus of claim 1, further comprising:
a control section that controls the organic solvent in the treatment tank so that it is maintained at a specified liquid surface level, specified temperature condition, and specified pressure condition, and agitation means in the treatment tank that applies agitation treatment to a gaseous phase section and/or the organic solvent inside the treatment tank, that allows purge treatment using inert gas while applying the agitation treatment.

4. The apparatus of claim 1, wherein the inert gas introduced from the inert gas inlet section is a mixture of the organic solvent in gaseous state and the inert gas.

5. The apparatus of claim 1, further comprising a first detector that detects a water-content concentration in the organic solvent inside the treatment tank and a second detector that detects a water-content concentration in the organic solvent inside the cooling treatment tank, wherein the organic solvent is discharged from the solvent outlet section or recovered liquid outlet section when its water-content concentration is at or below a specified value.

6. The apparatus of claim 1, further comprising:
a flow path that extracts part of the organic solvent discharged from the solvent outlet section and connects to the inert gas inlet section,
a vaporizer that vaporizes part of the organic solvent,
a pump that pressure-feeds the vaporized organic solvent, and
a mass-flow controller that controls the vaporized organic solvent at a specified supply flow rate.

7. The apparatus of claim 1 further comprising:
a flow path that extracts part of the separated liquid organic solvent discharged from the recovered liquid outlet section and connects to the treatment gas inlet section,
a vaporizer that vaporizes part of the organic solvent, and
a flow-rate adjustment section that adjusts the vaporized organic solvent to a specified supply flow rate.

8. A method of removing water content in organic solvents, the method comprising:
introducing the organic solvent to a treatment tank with a specified capacity at a controlled introduction rate so that a predetermined and specified liquid level is maintained;
heating the treatment tank so that it is controlled to maintain a predetermined and specified temperature condition;
introducing an inert gas to the treatment tank at a controlled introduction rate so that a reduction amount of a water-content concentration in the organic solvent is equal to or larger than a predetermined and specified value; and
discharging from the treatment tank a treatment gas containing the inert gas, the organic solvent, and water content.

9. The method of claim 8, wherein the organic solvents are nonpolar organic solvents or polar aprotic organic solvents.

10. The method of claim 8, further comprising:
discharging the organic solvent from the treatment tank when the water-content concentration in the organic solvent inside the treatment tank is equal to or less than a predetermined and specified value.

11. The method of claim 8, further comprising:
introducing the treatment gas to a cooling treatment tank having a specified capacity, the treatment gas cooled to a predetermined and specified temperature in order to separate gas and liquid; and
discharging the separated gas as waste gas from the cooling treatment tank.

12. The method of claim 11, further comprising:
discharging liquid organic solvent accumulated at a bottom of the cooling treatment tank when its level exceeds a predetermined and specified level.

* * * * *